Figure 1:
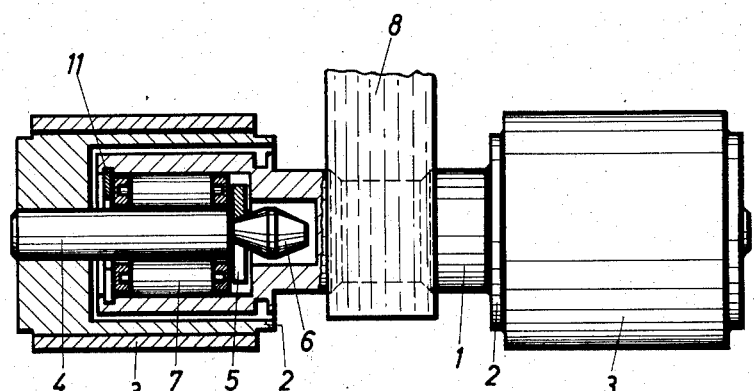

Feb. 17, 1959  E. MAURER  2,873,484
TOP ROLLS FOR DRAWING SYSTEMS
OF RING SPINNING FRAMES
Filed July 8, 1954

United States Patent Office 2,873,484
Patented Feb. 17, 1959

2,873,484

TOP ROLLS FOR DRAWING SYSTEMS OF RING SPINNING FRAMES

Eugen Maurer, Murrhardt, Germany, assignor to Rollenlager-Spindelfabrik "Spintex" G. m. b. H., Stuttgart-Bad Cannstatt, Germany Application July 8, 1954, Serial No. 442,043

4 Claims. (Cl. 19—142)

The present invention relates to new and useful improvements in top rolls for drawing systems of ring spinning frames and the primary object of the present invention is to provide a top roll assembly including a roll holder in which a journal, which is fixedly secured in the roll body or casing, is supported for rotary motion with the roll body surrounding the associated roll holder head, and wherein the top roll is axially secured by a retaining ring against unwanted wandering with respect to the roll holder.

It is known to fixedly mount two roll bodies on a pin extending in axial direction through the roll holder. Bushings, in which the pin carrying the roll bodies is guided, are pressed in the bore of the roll holder. In this case, the roll bodies themselves act as retainers for securing the pin against sliding out of the roll holder.

It is also known to mount the roll bodies independently of each other on the roll holder (loose boss type). In this instance, the roll bodies are mounted between two stops of which one is a tapered ring which in assembling the top roll bearing arrangement is drawn on the end of the roll holder after the roll body has been mountad.

In another known top roll structure a roller bearing is mounted in the annular space between the roll body and the roll holder, and radially elastic retaining rings, or the like, which are fixedly secured in a groove, secure the roll body against falling out of the roll holder.

The present invention has for its object to provide a top roll assembly including a roll holder which is simple and practical in construction and which for convenient fly removal can readily and easily be removed from the roll holder by hand with but little effort.

With these and other objects and advantages in view the invention embodies a top roll assembly wherein a resilient retaining ring, which can be contracted or expanded, secures the roll body against unwanted axial wandering with respect to the roll holder. Such a top roll structure not only prevents fly from entering the bearings, but is also simple in design and cheaper to build in comparison with the known arrangements with labyrinth seals and has the advantage of being just as inaccessible.

A further improvement of the structure of the invention resides in tapering the free end of the journal so as to facilitate its insertion into the retaining ring.

According to the present invention, the resilient retaining ring may be mounted in a coni-form recess provided in the journal oppositely to the tapered end thereof and forming a retaining shoulder thereon.

Figure 2:
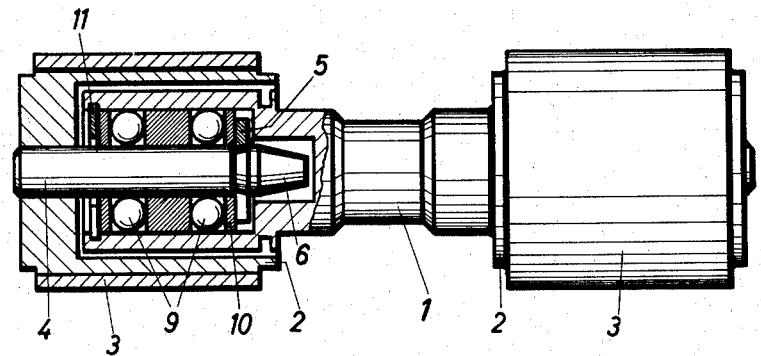

The foregoing and other objects of the invention will be best understood from the following description taken in connection with the accompanying drawings which illustrate specific embodiments of the invention. In the drawings:

Figure 1 is a view, partly in section and partly in elevation, of a top roll assembly constructed in accordance with the present invention and showing a bearing arrangement using a needle bearing, and Fig. 2 is a view corresponding to Fig. 1 but showing a bearing arrangement using a double-race ball bearing.

In the drawings like reference denote like or corresponding parts.

The principal parts of the top roll assembly shown in the drawings include a roll holder 1, a roll body 2, a lining 3 and a journal 4.

In the form of the invention illustrated in Fig. 1, the journal 4, which is rigidly secured in the roll body 2, is rotatably supported in a needle bearing 7, held in position by means of a resilient retaining ring 11 which, if biased radially inward, permits an easy removal thereof, together with the bearing. The outer extremity of the free end 6 of the journal 4 is tapered and a coni-form recess is provided oppositely to the tapered end. A contractible resilient retaining ring 5, adapted for releasably connecting the top roll with the roll holder, is mounted in said coniform recess and acts as retaining shoulder for preventing the roll body 2 from axial wandering with respect to the roll holder 1 and performs at the same time the function of a seal for preventing fly from entering the bearing. In operation, the thrust load exerted on the top roll is not as great as the frictional contact between the retaining ring 5 and the journal 4, but the frictional contact is nevertheless so little that the connection between the journal 4 and the roll holder 1 can be released with relatively little effort when the top roll is to be removed from the roll holder 1. Removal of the top roll from the roll holder is now and then necessary in order to remove accumulated fly. The tapered end 6 facilitates insertion of the journal 4 into the roll holder 1 respectively into its bearing elements. The roll holder 1 is arranged on the frame of the machine with the arm 8.

In the form of the invention illustrated in Fig. 2, the balls 9 of a ball bearing 10 rotatably support the journal 4 in the roll holder 1. A resilient retaining ring 5 of the extractable or expandable type adapted for releasably connecting the top roll to the roll holder 1 and for preventing axial displacement of the top roll with respect to the roll holder 1 is, like in Fig. 1, mounted in a coniform recess at the free end of the journal 4, and performs the same functions as that described in connection with Fig. 1.

It will be obvious that various modifications may be made in the embodiments above described without in any way departing from the spirit of the invention as defined in the appended claims.

What I claim is:

1. A top roll assembly for drawing systems of ring spinning frames comprising a hollow roll holder, a roll body, a lining on the outside of said roll body, bearings and a journal rotatably supported in said bearings in said roll holder, said journal having a free end and being fixedly secured with its other end in said roll body, and a resilient retaining ring mounted on said journal and adapted for releasably connecting said journal to said roll holder as well as for securing said roll body against axial displacement with respect to said roll holder.

2. A top roll assembly for drawing systems of ring spinning frames comprising a hollow roll holder, a roll body, a lining on the outside of said roll body, needle bearings and a journal rotatably supported in said needle bearings in said roll holder, said journal having a free end and being fixedly secured with its other end in said roll body, the outermost extremity of said free end being tapered and a coni-form recess being provided opposite to said tapered end, and a resilient retaining ring mounted in said coni-form recess and adapted for releasably connecting said journal to said roll holder as well as for securing said roll body against axial displacement with respect to said roll holder.

3. The top roll assembly as set forth in claim 1, wherein said journal is rotatably supported in ball bearings in said roll holder.

4. The top roll assembly of claim 2, wherein said resilient retaining ring is of the contractible type.

References Cited in the file of this patent

UNITED STATES PATENTS

| | | |
|---|---|---|
| 406,740 | Kellogg | July 9, 1889 |
| 2,150,796 | Brouwer et al. | Mar. 14, 1939 |
| 2,621,374 | Waite | Dec. 16, 1952 |

FOREIGN PATENTS

| | | |
|---|---|---|
| 434,481 | Italy | Apr. 27, 1948 |
| 803,699 | Germany | of 1951 |
| 870,115 | France | Dec. 5, 1941 |
| 884,584 | France | Apr. 27, 1943 |